Feb. 19, 1924.

L. A. M. PHELAN

ELECTRICAL APPARATUS

Filed Feb. 20, 1922

1,484,156

Inventor:
Louis A. M. Phelan

Witness:
Geo. W. Hansen

By Jones, Addington, Ames & Seibold
Attys.

Patented Feb. 19, 1924.

1,484,156

UNITED STATES PATENT OFFICE.

LOUIS A. M. PHELAN, OF BELOIT, WISCONSIN.

ELECTRICAL APPARATUS.

Application filed February 20, 1922. Serial No. 537,884.

*To all whom it may concern:*

Be it known that I, LOUIS A. M. PHELAN, a citizen of the United States, residing at Beloit, in the county of Rock and State of Wisconsin, have invented new and useful Improvements in Electrical Apparatus, of which the following is a full, clear, concise, and exact description, reference being had to the accompanying drawing, forming a part of this specification.

My invention relates to electrical apparatus and it has special reference to electrical safety switches that may be employed in connection with other electrical devices, such as electrical heating devices and the like, and which serve to open automatically the associated electric circuit in the event that such devices are subjected to abnormal conditions.

More particularly my present invention refers to a gravity-type electric switch which, when in its normal operating position, maintains the associated electric circuit closed, but when displaced in any direction from its normal operating position serves to open automatically the circuit, thereby affording protection against fire to surrounding material, as well as to the device in which my switch is incorporated as a protective feature.

In connection with electrical devices and particularly the various types of electrical heating apparatuses which have come into common use, such as devices that are extensively employed for household purposes, it is highly desirable to afford protection against the possibility of fires arising from the unduly heating of the electrical devices or the inadvertent placing of them in close proximity to inflammable materials. This provision for protection is especially important in connection with electrical radiant heaters, since the electric heating elements thereof are capable of generating a high degree of heat and accidents frequently occur which tip over such heating devices, thereby likely to bring the electrical heating element into close proximity to inflammable materials. A common form of portable electrical radiant heater embodying an exposed heating element has come into wide use and this form of heater is particularly susceptible to being tipped over and knocked down thereby endangering the surrounding material.

My present invention pertains to safety switches for electrical apparatus of the character outlined above, and it has for one of its objects to provide a safety device which will be simple and economical to construct and which may be incorporated with very little additional expense in an electrical apparatus as a protective feature. Moreover, my present electrical safety switch is of the gravity type and does not require frequent inspection in order to assure its operating satisfactorily when an occasion arises which makes the operating of my safety switch highly desirable in order to afford that protection for which my safety switch is designed.

For the accomplishment of the foregoing objects and other objects which will be hereinafter described and pointed out with particularity, my present invention is designed, and for a better understanding thereof, reference may be had to the following description and the accompanying drawing, in which—

Figure 1:
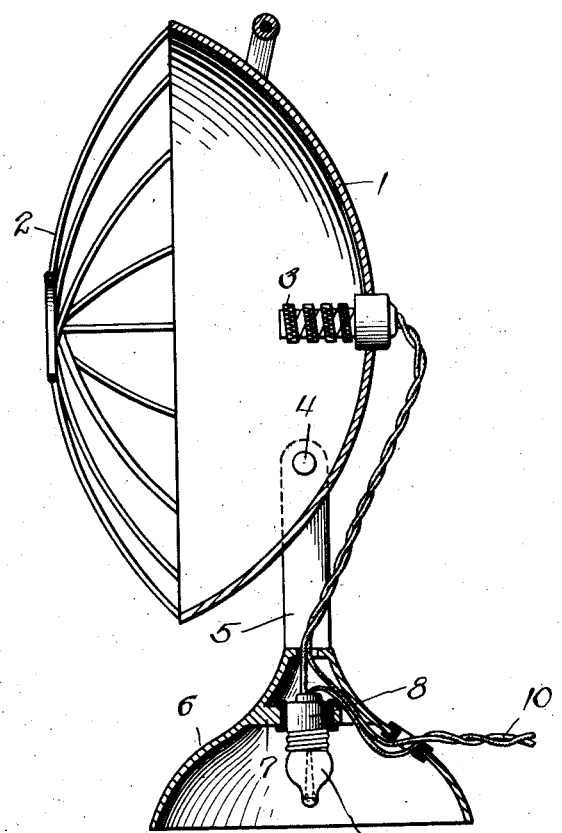
Fig. 1 is a view somewhat diagrammatic of an electrical radiant heater embodying a form of my safety switch.

Referring to Fig. 1, the radiant electric heater comprises a bowl reflector 1 which is provided with a front guard 2 secured to the bowl in any suitable fashion. An exposed electric heating element 3, formed from an uncovered current-conducting wire, is positioned at the focus of the bowl reflector 1. This association of the electric heating element 3 in connection with the bowl 1 ensures that the heat developed by the heating element will be reflected and radiated outwardly from the bowl through the open framework of the guard 2.

The bowl 1 is pivotally mounted at 4 upon a support 5 which, in turn, is secured to a base 6. The base 6 is a hollow structure provided with a partition 7 in which a standard electric lamp socket 8 is received. A gravity type switch 9 embodying a form of my invention is screwed into the lamp socket 8, and electric current conducting leads 10 establish an electric circuit through the safety device 9 and the heating element 3 of the radiant heater.

Figure 2:
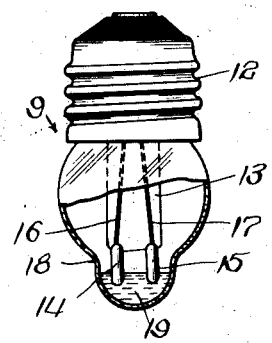
Fig. 2 is a view of a safety switch embodying a form of my invention and showing the safety switch in circuit-closing position.
Figure 3:
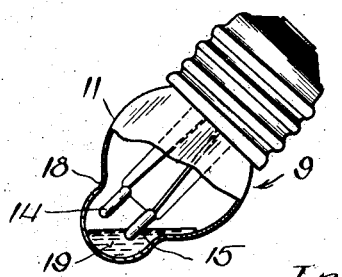
Fig. 3 illustrates the device of Fig. 2 tilted or displaced from its normal operating position whereby the switch occupies a circuit-opening position.

By referring to Figs. 2 and 3 it will be observed that the gravity switch of my invention comprises a container 11 which is sealed and preferably made of glass, the same being secured to a standard lamp screw base 12, the latter serving as a means for attaching the safety device 9 of Fig. 1 to the electric socket 8. The container 11 houses a central support or stem 13 which, in the event that the container 11 is formed of glass, is likewise of glass and integrally formed with the container 11. Spaced and cooperating electrodes 14 and 15 are sealed into the support 13, projecting therefrom in such fashion that said electrodes occupy a central position within the container 11. Leading-in wires 16 and 17 serve to connect the electrodes 14 and 15 respectively to the lamp base 12 such as commonly employed in connecting an incandescent lamp filament in circuit. The leading-in wires 16 and 17 are completely embedded in the glass support and may be made of dumet wire or the like.

The container 11 is provided at its end portion opposite to the lamp base 12 with an annular constriction 18 which forms an open chamber within the container 1¹ that houses a body of mercury 19. The gravity switch of Fig. 2 is shown in its normal operating position and, as a consequence, the body of mercury 19 bridges the spaced electrodes 14 and 15 which extend into the body of mercury 19 thereby placing them in electrical conducting relation with each other. At the same time, the body of mercury 19 occupies a lowermost position within the container 11 and below the constriction 18. The electrodes 14 and 15 project into the body of mercury 19 from above but it is to be noted that the mercury may flow on all sides of the electrodes 14 and 15.

When the device in Fig. 2 is tilted, as shown in Fig. 3, the body of mercury 19, by reason of gravity action, automatically opens the electric circuit between the electrodes 14 and 15. Further tilting of the device will cause the mercury 19 to flow entirely from the constricted portion of the container 11 and, in this circumstance, the electrodes 14 and 15 are disconnected from each other and the body of mercury 19 passes completely without the range of either of said electrodes.

By referring again to Fig. 1, it will be noted that when the base member 6 of the heater occupies its normal operating position the gravity switch of my invention closes the electric circuit between the electrodes 14 and 15 and, as a consequence, the electrical circuit through the heating element 3. The bowl 1 may, of course, be tilted in many positions by rotating it about the pivot 4 on the support 5. Of course, in this circumstance the base 6 is maintained upright even though the bowl 1, with the associated heating element 3, may be tilted through a wide angular displacement. Under these conditions the safety switch 9 maintains the circuit through the heating element 3 intact. However, if the heater is tipped over or toppled in any direction which causes the base member 6 to be displaced from its normal operating position, the gravity switch will automatically open the associated electric circuit and thereby immediately disconnect the heating element 3 from circuit. As a result, the surrounding material which may be brought into contact with the heating element 3 is afforded protection since my switch 9 is so designed that only a slight tilting movement of the base 6 serves to open the electric circuit through the heating element 3.

While I have shown and described my present invention associated with an electric radiant heater, it is to be understood that my invention is susceptible to many other uses in connection with electrical devices in which it is highly desirable to afford protection against fire and the like and, therefore, I desire that such limitations only be placed on my invention as are required by the state of the prior art and specially pointed out in the appended claims.

Having thus described my invention, what I claim as new and desire to secure by Letters Patent of the United States is:

1. A gravity-type electric switch comprising a movable circuit-closing element which, when the switch is in normal position maintains the associated electric circuit closed and when the said switch is displaced from normal position in any direction, opens automatically the associated electric circuit.

2. An electric switching device comprising a container, two spaced cooperating electrodes sealed therein, and a body of conducting fluid in said container into which said electrodes project to close an electric circuit, said electrodes being secured to a common support and said container being substantially symmetrical in respect to the axis of said support.

3. An electric switching device comprising a container, two spaced stationary cooperating electrodes disposed therein, a central support for said electrodes, and a body of mercury which bridges said electrodes when the switching device occupies its normal position, said container being provided at one of its end portions with a constriction below which said body of mercury is normally housed.

4. An electric switching device comprising a container having a constriction adjacent to one of its end portions, a body of mercury normally housed in a chamber formed by said constriction, means attached to the other end portion of said container for engaging an electric socket, a central stem within the container extending from the end thereof which is adjacent to said engaging means, and cooperating electrodes supported by said stem.

5. An electric switching device comprising a container, two spaced cooperating electrodes sealed therein, a body of mercury in said container into which said electrodes may project at predetermined times to close an electric circuit, a common support for said electrodes disposed centrally in said container, and means attached to said container to effect engagement with an electric socket.

6. An electric switching device comprising a container, two spaced cooperating electrodes sealed therein, a body of mercury in said container into which said electrodes normally project to close an electric circuit, a common support for supporting said electrodes centrally in said container and above the normal position of said body of mercury, and means attached to said container oppositely of the normal position of said body of mercury for securing said switch in an electric socket.

7. The combination with an electric device comprising a supporting member therefor, of protective means for said device associated with said supporting member where the electric circuit of said device is automatically opened when said device is displaced in any direction from the operating positions that it may occupy.

8. The combination with an exposed electric heating element, and a base for supporting said element, of a protective device disposed in said base, said protective device automatically opening the electric circuit of said element when it is displaced in any direction from any of its operating positions and for automatically closing the electric circuit of said element when the same is restored to any of its operative positions.

9. An electric switch comprising a sealed container, spaced cooperating electrodes disposed therein, a common support for said electrodes, a body of mercury in said container, and means attached to said container to secure said switch in an electric socket whereby the said electrodes may be connected to an exterior electrical circuit.

In witness whereof, I have hereunto subscribed my name.

LOUIS A. M. PHELAN.

Witnesses:
F. W. POTTER,
H. S. McCARTHY.